(12) United States Patent
Mock et al.

(10) Patent No.: US 8,014,806 B2
(45) Date of Patent: Sep. 6, 2011

(54) DYNAMIC CREATION OF A COMMUNICATION GROUP THAT INCLUDES CONTACTS IDENTIFIED IN ONE OR MORE CONTACT LEVELS

(75) Inventors: Von A. Mock, Boynton Beach, FL (US); Yong C. Lee, Chandler, AZ (US)

(73) Assignee: Motorola Mobility, Inc., Libertyville, IL (US)

( * ) Notice: Subject to any disclaimer, the term of this patent is extended or adjusted under 35 U.S.C. 154(b) by 922 days.

(21) Appl. No.: 11/537,455

(22) Filed: Sep. 29, 2006

(65) Prior Publication Data

US 2008/0081653 A1  Apr. 3, 2008

(51) Int. Cl.
    *H04B 7/00* (2006.01)
(52) U.S. Cl. .... 455/518; 455/519; 455/90.2; 455/456.3; 455/416; 370/260; 709/202
(58) Field of Classification Search ................. 455/518, 455/517, 519, 514, 3.05, 90.2, 415, 416, 455/417, 418, 456.3, 456.4; 370/260, 261, 370/262, 432; 707/10, 101; 709/207, 202
See application file for complete search history.

(56) References Cited

U.S. PATENT DOCUMENTS

| | | | |
|---|---|---|---|
| 6,519,771 B1 | 2/2003 | Zenith | |
| 6,754,904 B1 | 6/2004 | Cooper et al. | |
| 6,757,517 B2 | 6/2004 | Chang | |
| 7,251,495 B2 * | 7/2007 | Keyani et al. | ................. 455/466 |
| 2002/0090132 A1 | 7/2002 | Boncyk et al. | |
| 2003/0101450 A1 | 5/2003 | Davidsson et al. | |
| 2003/0119540 A1 | 6/2003 | Mathis | |
| 2004/0208372 A1 | 10/2004 | Boncyk et al. | |
| 2005/0159970 A1 | 7/2005 | Buyukkokten et al. | |
| 2005/0172001 A1 | 8/2005 | Zaner et al. | |
| 2005/0192041 A1 * | 9/2005 | Oxley et al. | ................... 455/519 |
| 2005/0286546 A1 | 12/2005 | Bassoli et al. | |
| 2006/0002328 A1 | 1/2006 | Naghian | |
| 2006/0002607 A1 | 1/2006 | Boncyk et al. | |
| 2006/0036641 A1 | 2/2006 | Brydon et al. | |

(Continued)

FOREIGN PATENT DOCUMENTS

| KR | 1020060121470 A | 11/2006 |
|---|---|---|
| KR | 100661743 B1 | 12/2006 |

OTHER PUBLICATIONS dodgeball.com homepage, Bringing Your Phone to Life, http://www.dodgeball.com/, Accessed Sep. 28, 2006, 2 pgs.

(Continued)

*Primary Examiner* — Matthew D Anderson
*Assistant Examiner* — Shaima Q Aminzay
(74) *Attorney, Agent, or Firm* — Cuenot, Forsythe & Kim, LLC

(57) ABSTRACT

A method (500) for dynamically creating a communication group. The method can include identifying a first contact (100) and automatically identifying a plurality of contacts (110, 120, 130, 140, 150) within a number (N) of levels removed from the first contact. The first contact can be included as one of the plurality of contacts or excluded from such plurality of contacts. The method further can include selecting at least a portion of the identified contacts to include within the communication group. Identifying the first contact can include processing an image that includes first contact. In another arrangement, a selection of the first contact from a contact list can be received. In yet another arrangement, a selection of the first contact from a recent call list can be received.

20 Claims, 3 Drawing Sheets

U.S. PATENT DOCUMENTS

| | | |
|---|---|---|
| 2006/0179160 A1 | 8/2006 | Uehara et al. |
| 2006/0233203 A1 | 10/2006 | Iwamura |
| 2006/0242234 A1 | 10/2006 | Counts et al. |
| 2006/0270395 A1 | 11/2006 | Dhawan et al. |
| 2009/0300518 A1 | 12/2009 | Mock et al. |

OTHER PUBLICATIONS

The ground breaking social networking site from SpeedDater, http://www.jamboo.com/, Accessed Sep. 28, 2006, 1 pg.

User interface representation image, www.stevenblyth.com/mysocialfabric/index.html, Accessed Jul. 17, 2006, 1 pg.

PCT "Notification of Transmittal of the International Search Report and the Wratten Opinion of the International Searching Authority, or the Declaration" Dec. 28, 2009, pp. 1-11, PCT/US2009/045423, Korean Intellectual Property Office.

* cited by examiner

300

400

500

```
┌─────────────────────────────────────────────────────┐
│ Receive a request to create a communication group,  │
│ the request indicating a first contact              │
│                                                 505 │
└─────────────────────────────────────────────────────┘
                          │
                          ▼
┌─────────────────────────────────────────────────────┐
│ Automatically identify other contacts within a      │
│ number (N) of levels removed from the first contact │
│                                                 510 │
└─────────────────────────────────────────────────────┘
                          │
                          ▼
┌─────────────────────────────────────────────────────┐
│ Select at least a portion of the identified         │
│ contacts to include within the communication group  │
│                                                 515 │
└─────────────────────────────────────────────────────┘
                          │
                          ▼
┌─────────────────────────────────────────────────────┐
│ Create the communication group                      │
│                                                 520 │
└─────────────────────────────────────────────────────┘
                          │
                          ▼
┌─────────────────────────────────────────────────────┐
│ Make communication group accessible to a user       │
│                                                 525 │
└─────────────────────────────────────────────────────┘
```

FIG. 5

DYNAMIC CREATION OF A COMMUNICATION GROUP THAT INCLUDES CONTACTS IDENTIFIED IN ONE OR MORE CONTACT LEVELS

BACKGROUND OF THE INVENTION

1. Field of the Invention

The present invention generally relates to network communications and, more particularly, to creation of user communication groups.

2. Background of the Invention

The use of mobile stations has grown to an extent that such devices are now ubiquitous throughout most of the industrialized world. Just as their use has grown, so too has the functionality of mobile stations. Indeed, mobile stations now can be used not only for voice communications, but also to perform a number of other tasks. For example, mobile stations can be used to take photographs, capture and stream video, browse the Internet, play games, and send and receive instant messages and e-mail. Nonetheless, consumers continue to demand ever greater functionality, flexibility and ease of use from their mobile stations.

SUMMARY OF THE INVENTION

The present invention relates to a method for dynamically creating a communication group. The method can include identifying a first contact and automatically identifying a plurality of contacts within a number (N) of levels removed from the first contact. The first contact can be included as one of the plurality of contacts or excluded from such plurality of contacts. The method further can include selecting at least a portion of the identified contacts to include within the communication group.

In one arrangement, identifying the first contact can include processing an image that includes the first contact. In another arrangement, a selection of the first contact from a contact list can be received. In yet another arrangement, a selection of the first contact from a recent call list can be received.

Selecting at least a portion of the identified contacts can include selecting all contacts within the number of levels. Alternatively, selecting at least a portion of the identified contacts can include selecting all contacts at a level N. In another arrangement, selecting at least a portion of the identified contacts can include selecting a sub-group of closely associated contacts from among the identified contacts.

The present invention also relates to an apparatus that includes a communications adapter or a user interface that receives a request identifying a first contact. The apparatus also can include a processor that automatically identifies a plurality of contacts within a number (N) of levels removed from the first contact and selects at least a portion of the identified contacts to include within the communication group. The processor also can identify the first contact by processing an image including the first contact. The processor can automatically select at least a portion of the identified contacts by selecting all contacts within the number of levels, or by selecting all contacts at a level N. The processor also can receive a selection of a sub-group of closely associated contacts, the sub-group selected from among the identified contacts.

Another embodiment of the present invention can include a machine readable storage being programmed to cause a machine to perform the various steps described herein.

BRIEF DESCRIPTION OF THE DRAWINGS

Preferred embodiments of the present invention will be described below in more detail, with reference to the accompanying drawings, in which:

FIG. 5 is a flowchart that is useful for understanding the present invention.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
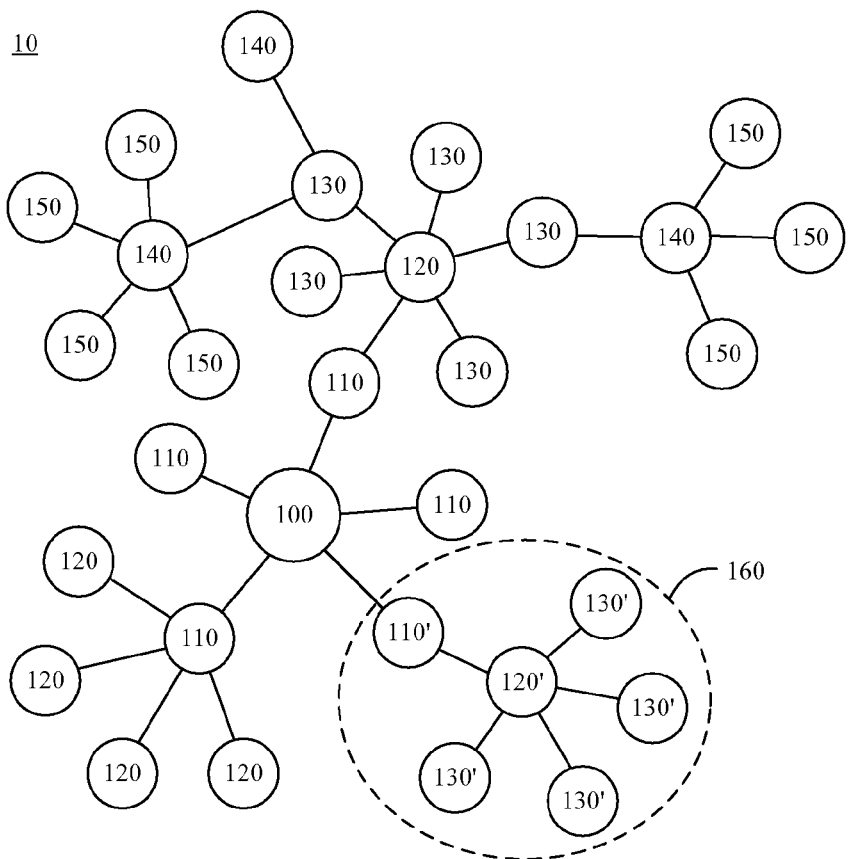
FIG. 1 depicts a social network diagram that is useful for understanding the present invention.

FIG. 1 depicts a social network diagram 10 that is useful for understanding the present invention, which relates to a method and a system for dynamically creating a communication group. In particular, a first contact 100 can be identified and the communication group can be created to comprise other contacts associated with the first contact. The other contacts can be contacts that are automatically identified to be within a number (N) of levels (or degrees) removed from the first contact.

For the contact 100, first level contacts can be contacts 110, which are directly associated with the contact 100. For example, the contacts 110 can be contained in the contact list of the contact 100, contacts that have recently placed calls to the contact 100, or contacts that have recently received calls from the contact 100. Contacts 120 which are not directly associated with the contact 100 (e.g. not contained in a contact list associated with the contact 100), but instead are associated with the contacts 110, can be second level contacts with respect to the contact 100. Similarly, the contacts 130, which may be associated with the contacts 120, may be third level contacts. Contacts 140 may be fourth level contacts, contacts 150 may be fifth level contacts, and so on. It will be appreciated that any number of contact levels can be identified, and thus the number (N) can be represented by any suitable identifier. For instance, the number (N) can be represented by numeric and/or alphabetic characters (e.g. 1, 2, 3, A, B, C, A1, A2, A3, etc.) which may be correlated to the number.

In one arrangement, a user can be prompted to enter a value for N when a request to create a communication group is received. In another arrangement, a value for N can be entered into a device or application setting or a default value of N can be used. When N=1, for example, the contacts comprising the communication group can include first level contacts 110. When N=1, contacts 120, 130, 140, 150 that are two or more levels removed from the first contact 100 can be excluded from the communication group. When N=2, the other contacts can include first level contacts 110 and second level contacts 120. When N=2, contacts 130, 140, 150 that are three or more levels removed from the first contact 100 can be excluded from the communication group. Similarly, for N=3, the other contacts can include first level contacts 110, second level contacts 120 and third level contacts 130. When N=3, contacts 140, 150 that are four or more levels removed from the first contact 100 can be excluded from the communication group. It will be appreciated that this process can be applied to any values of N.

In one aspect of the invention, one or more sub-groups 160 (or leafs) of contacts 110', 120', 130' can be selected to be included in the communication group. For example, the social network diagram 100 can be presented to a user via a user interface. The social network diagram can represent all contacts 100-150 up through a level N and indicate their relationships to one another. The user then can identify one or more sub-groups of contacts, for instance the sub-group 160. The contacts 110'-130' contained in the sub-group 160 can be closely associated. For example, each of the contacts 110', 130' can have a direct association with a particular contact 120'.

The user can identify the sub-group 160 in any suitable manner. For example, the user can draw a circle around the sub-group 160 on a touch screen using a stylus. In another arrangement, the user can select a primary contact, such as contact 120', and all contacts 110', 130' having a direct association with the selected contact 120' can be identified. Still, sub-groups of contacts can be identified in any other suitable manner and the invention is not limited in this regard.

The first contact 100 can be included in the communication group or excluded from the communication group. For example, if a surprise party is being planned for the first contact 100 and the communication group is being created for an invitation list, it may be desirable to exclude the first contact. In another arrangement, certain levels (or degrees) can be included or excluded from the communication group. For instance, a communication group can be formed to exclusively include contacts 120 (e.g. N=2) or the contacts 110-130 contained within the sub-group 160.

The first contact 100 can be selected from a contact list or selected from a recent call list. In another arrangement, an image of the first contact 100 can be processed to identify the first contact 100. The image can be captured via an image capture device or received from another device. For instance, the image can be transferred from a server, a communication device, a scanner, a facsimile machine, a datastore, or any other device or system capable of transferring an image. Still, the first contact 100 can be identified in any other suitable manner and the invention is not limited in this regard.

Figure 2:
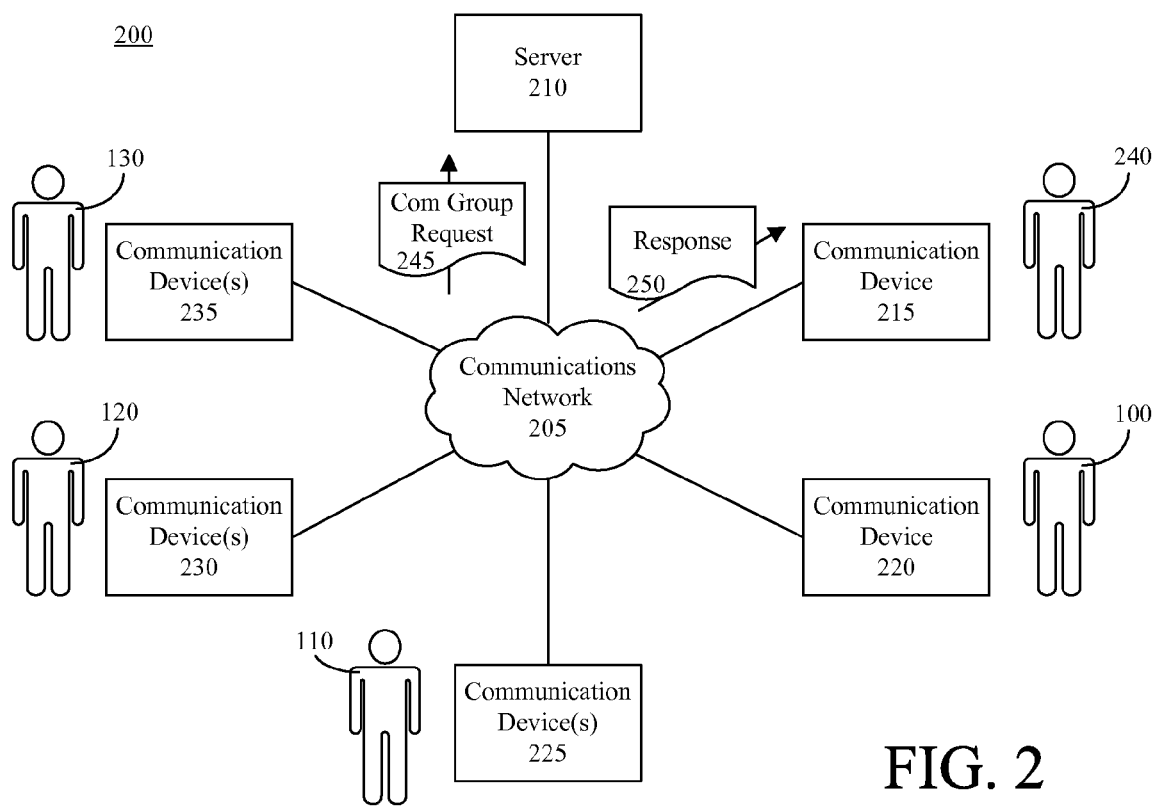
FIG. 2 depicts a communications system that is useful for understanding the present invention.

FIG. 2 depicts a communications system 200 that is useful for understanding the present invention. The communications system 200 can include a communications network 205. The communications network 205 can comprise, for example, the Internet, the World Wide Web, a wide area network (WAN), a local area network (LAN), a cellular communications network, a dispatch communications network, an interconnect communications network, a public switched telephone network (PSTN), and/or any other networks or systems over which communication signals can be propagated. In that regard, the communications network can include wired and/or wireless communication links.

The communications system 200 can include a plurality of apparatuses communicatively linked to the communications network 205. For example the communications system 200 can include a server 210 and one or more communication devices 215, 220, 225, 230, 235. The server 210 can be a mobile switching center (MSC), a base station controller (BSC), a base transceiver station (BTS), a network server, a web server, or any other processing device which may process communication signals communicated to and/or from communication the devices 215-235.

In one arrangement, one or more of the communication devices 215-235 can be wireless communication devices, for instance mobile stations. Examples of such mobile stations can include mobile computers, personal digital assistants (PDAs), mobile telephones, mobile radios, mobile gaming devices, etc. In another arrangement, one or more of the communication devices 215-235 can be wired communication devices, examples of which can include telephones, computers, gaming devices, and the like.

In operation, a user of a communication device, such as the user 240 of the communication device 215, can request that a communication group be dynamically created. For example, the user can enter one or more user inputs via a user interface of the communication device 215, and the communication device 215 can propagate a corresponding request 245 to the server 210 requesting that the server 210 create a communication group. Alternatively, the request can be communicated to a suitable application instantiated on the communication device 215. In such an arrangement, any processes described herein as being implemented by the server can be implemented by the communication device 215.

The request 245 can include a contact identifier that corresponds to the first contact 100. The identifier can include an indicator that identifies the first contact 100 by a user name, a telephone number, an e-mail address, or a communication device 220 with which the contact 100 is associated. For example, the indicator can comprise a media access control (MAC) address of the communication device 220. In another arrangement, the request 245 can include an image of the first contact 100. Still, the identifier can be any other suitable identifier that corresponds to the contact 100 and the invention is not limited in this regard. Also, in addition to the first contact 100, additional contacts to use as a basis for forming a communication group also can be identified.

The request 245 also can include one or more indicators that indicate which level(s) or sub-groups of associated contacts to include in the communication group. For example, the request 245 can include an indicator that indicates to include a first level of contacts 110 and a second level of contacts 220. The request 245 also can include an indicator that indicates whether to include the first contact 100 in the communication group.

The server 210 can process the request 245 to form the communication group in any suitable manner. For example, the server 210 can access a first contact list associated with the first contact 100. The first contact list can be maintained on the server 210, on the communication device 220, or on any other node of the communications network 205. The server 210 can process the first contact list to identify the first level contacts 110. If such contacts 110 are to be included in the communication group, the server 210 can add such contacts to the communication group.

If the levels of contacts to be included in the communication group exceed the first level, the server 210 can access contact lists associated with the first level contacts 110 to identify the second level contacts 120. Again, such contact lists can be maintained on the server 210, on the communication devices 225, or on any other node of the communications network 205. If required, the server 210 can access contact lists associated with the second level contacts 120 to identify third level contacts 130, and so on. The server 210 can add contacts at any requested contact level(s) to the communication group. In an arrangement in which the social network diagram is presented to the user 240, the server can access the contact lists to generate the diagram and to reference when processing selections of contact sub-groups.

Once the communication group has been created, the server 210 can make such group available to the user 240. For example, the server 210 can forward a response 250 to the communication device 215. The response 250 can include a listing of contacts 110, 120 included in the communication group. In another arrangement, the response 250 can provide an indicator, such as a link, that indicates where such a listing can be accessed. In addition to the contacts 110, 120, the listing can indicate to which contact levels each of the contacts 110, 120 belong.

In yet another arrangement, the response 250 can indicate that the communication group has been formed, but the list of contacts in the communication group can be securely maintained by the server 210. In such an arrangement, the user 240 can select to forward a communication to the communication group, in which case all of the contacts in the communication group may receive the communication, even though the user 240 may not have knowledge of exactly which contacts have been included. In one aspect of the inventive arrangements, the communication to be forwarded to the communication group can be included in the request 245, and the server 210 can automatically propagate the communication to the identified contacts in response to receiving the request 245.

Some contacts 100, 110, 120, 130 may not wish to participate in dynamic communication groups formed as described herein. Accordingly, such contacts 100, 110, 120, 130 can be provided selectable options to indicate whether they wish to participate and, if so, security settings that are to be implemented. For instance, each of the communication devices 215-235 can include a menu comprising an option that may be selected to participate in dynamic communication groups or to disable such participation. Options to mask user identities, communication device indicators, and the like also can be provided. If a particular contact 110 has indicated that he does not wish to participate, the server 210 can exclude such contact from the communication group. The server also can include or exclude any contacts 120 associated with the contact 110, depending on the security settings of the contacts 120 and/or the security settings of the contact 110.

Figure 3:
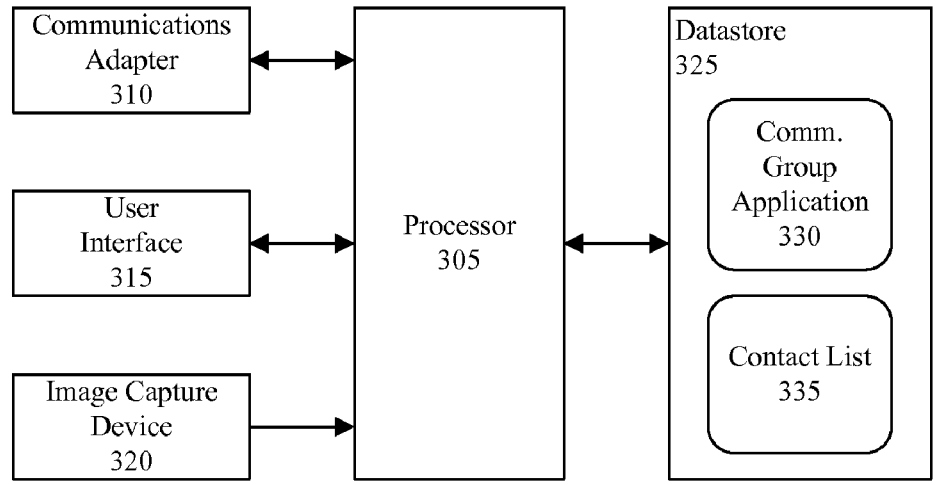
FIG. 3 depicts a block diagram of a communication device that is useful for understanding the present invention.

FIG. 3 depicts a block diagram of a communication device 300 that is useful for understanding the present invention. The communication device 300 can include a processor 305. The processor can comprise, for example, a central processing unit (CPU), a digital signal processor (DSP), an application specific integrated circuit (ASIC), a programmable logic device (PLD), a plurality of discrete components that cooperate to process data, and/or any other suitable processing device.

The communication device 300 also can include a communications adapter 310. The communications adapter 310 can include a network adapter suitable for communicating via a communications network, for example via a network node, an access point, a router or a switch. For instance, the network adapter can include a transceiver that communicates data via wireless communications and/or a communications port or network adapter that communicates via wired communications. The communications adapter 310 also can include a short range wireless communications transceiver, for example a Bluetooth or Zigbee adapter. Still, the communications adapter 310 can include any other systems or components which support communications between the communication device 300 and any other devices or systems.

A user interface 315 also may be provided with the communication device 300. The user interface 315 can include a keypad, a display, buttons, sensors, input and output audio transducers, and/or any other devices which may receive user inputs or present information to a user. In one arrangement, the display can be a touch screen.

The communication device 300 also can include an image capture device 320. The image capture device 320 can include an image sensor, such as charge-coupled device (CCD), a complementary metal oxide semiconductor (CMOS) image sensor, or any other image sensor suitable for detecting images. The image capture device 320 also can include an image processor that processes the images detected by the image sensor and generates image data. Image capture devices are well known to those skilled in the art.

Further, the communication device 300 can include a datastore 325. The datastore 325 can include one or more storage devices, each of which can include a magnetic storage medium, an electronic storage medium, an optical storage medium, a magneto-optical storage medium, and/or any other storage medium suitable for storing digital information. In one arrangement, the datastore 325 can be integrated into the processor 305.

A communication group application 330 can be contained on the datastore 325. The communication group application 330 can be executed by the processor 305 to implement the methods and processes described herein. For example, at runtime the communication group application 330 can receive a user input from the user interface 315 requesting that a dynamic communication group be formed and identifying levels of contacts to include in the communication group. The communication group application 330 also can receive a user input identifying at least a first contact on which a communication group can be based. Such contacts can be selected from a contact list 335.

In one aspect of the invention, the user input identifying the first contact can be an image or images representing the first contact. Additional contacts also can be represented in such an image. The image can be received in an e-mail, an instant message, a contact profile, or received in any other suitable manner. In one arrangement, the image can be communicated to the communication group application 330 from the image capture device 320, and one or more contacts represented by the image can be selected for forming the communication group.

In an arrangement in which the user is to select sub-groups, or leafs, of contacts from the social network diagram, such diagram can be communicated from the communication group application 330 to the user interface 315 for presentation on the display. The communication group application 330 can receive from the server, via the communications adapter 310, social networking information from which to generate the social network diagram. The communication group application 330 can receive selections of contact sub-groups from the user interface 315.

Once one or more contacts have been identified as a basis for forming the communication group and the contact levels have been identified, the communication group application can communicate such information to the server in a request. The request can be communicated from the communication device 300 to the server via the communications adapter 310.

Figure 4:
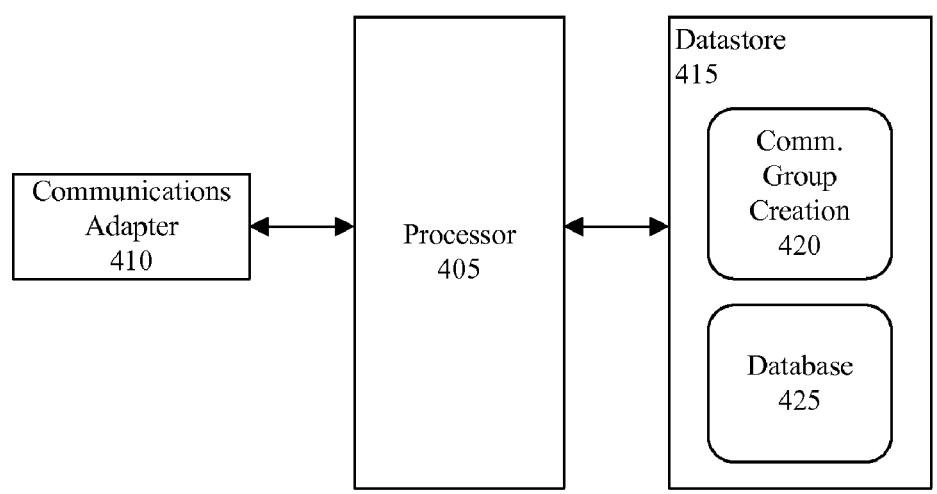
FIG. 4 depicts a block diagram of a server that is useful for understanding the present invention.

FIG. 4 depicts a block diagram of a server 400 that is useful for understanding the present invention. The server 400 can include a processor, which can comprise, for example, a CPU, a DSP, an ASIC, a PLD, a plurality of discrete components that cooperate to process data, and/or any other suitable processing device.

The server 400 also can include a communications adapter 410. The communications adapter 410 can include a network adapter suitable for communicating via a communications network. For example, the network adapter can include a transceiver that communicates data via wireless communications and/or a communications port or network adapter that communicates via wired communications. The communications adapter 410 also can include any other systems or components which support communications between the server 400 and any other devices or systems.

Further, the server 400 can include a datastore 415. The datastore 415 can include one or more storage devices, each of which can include a magnetic storage medium, an electronic storage medium, an optical storage medium, a magneto-optical storage medium, and/or any other storage medium suitable for storing digital information. In one arrangement, the datastore 415 can be integrated into the processor 405.

A communication group creation application 420 can be contained on the datastore 415. The communication group creation application (hereafter "application") 420 can be executed by the processor 405 to implement the methods and processes described herein. For example, at runtime the application 420 can receive a request from a communication device to create a communication group. Such request can be received via the communications adapter 410.

Based on the request, the application 420 can identify a first contact. For instance, the application 420 can parse the request to identify a user name. In an arrangement in which the request contains an image, the application 420 can process the image to identify one or contacts contained in the image. For example, the application 420 can compare the image to known images associated with contacts. Such images can be contained in a database 425 accessible to the application 420. For instance, the database 425 can be contained on the datastore 415 and/or contained on a device to which the server 405 is communicatively linked.

In another arrangement, the application 420 can process the image to identify attributes within the image that are associated with a particular contact. Such processing can be performed using known image processing techniques. For example, the database 425 can include a master list of contacts, and each contact record within the master list can include a unique attribute, or a plurality of attributes which form a combination that is unique to the contact. In such an arrangement, the master list of contacts also can include association attributes that associate a contact with other contacts (e.g. associates a first level contact with second level contacts).

In one aspect of the invention, a discriminator algorithm can process the image to identify relevant portions in the image, and decomposition can be performed on such portions to identify different quantifiable salient attributes. The image decomposition can include radiometric correction, segmentation and/or segment group generation. For each generated segment group, additional processing steps can be performed, for instance bounding box generation, geometric normalization, wavelet decomposition, color cube decomposition, shape decomposition and/or low-resolution grayscale image generation. Such techniques are described in U.S. Patent Application Publication No. US 2002/0090132 A1 filed Nov. 5, 2001, which is herein incorporated by reference in its entirety. In the case of conflict, the present specification, including definitions, will control.

FIG. 5 is a flowchart presenting a method 500 that is useful for understanding the present invention. At step 505, a request to create a communication group can be received. The request can indicate a first contact. For example, the request can include an image of the first contact, a user name, a telephone number, an e-mail address, a MAC address, or any other suitable identifier. The request also can indicate a number (N) of levels removed from the first contact that are to be identified.

Proceeding to step 510, other contacts within N levels removed from the first contact can be automatically identified. At step 515, at least a portion of the identified contacts can be selected to be included within the communication group. For example, the selected contacts can include exclusively those contacts positioned at level N, or all contacts at all levels up through level N. Alternatively, a plurality of levels can be specified and the identified contacts can be contacts contained in the specified levels. In yet another arrangement, a sub-group, or leaf, of closely associated contacts can be selected. Continuing to step 520, the communication group can be created. At step 525, the communication group can be made accessible to a user. For example, the user can send one or more messages to the communication group.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in an application product, which comprises all the features enabling the implementation of the methods described herein, and which when loaded in a processing system is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

This invention can be embodied in other forms without departing from the spirit or essential attributes thereof. Accordingly, reference should be made to the following claims, rather than to the foregoing specification, as indicating the scope of the invention.

What is claimed is:

1. A method for dynamically creating a communication group, comprising:
within a first communication device, via a processor, identifying a first contact associated with a second communication device;
within the first communication device, via the processor, indicating a number (N) of levels, associated with the first contact, to identify a plurality of contacts contained within the number (N) of levels, wherein contacts at a first level (N=1) are contained in a contact list of the first contact and contacts at levels greater than 1 (N>1) are not contained in the contact list of the first contact; and
via the processor, selecting at least a portion of the identified contacts to include within the communication group.

2. The method of claim 1, wherein identifying the first contact comprises processing an image comprising the first contact.

3. The method of claim 1, wherein identifying the first contact comprises receiving a selection of the first contact from a contact list.

4. The method of claim 1, wherein identifying the first contact comprises receiving a selection of the first contact from a recent call list.

5. The method of claim 1, wherein selecting at least a portion of the identified contacts comprises selecting all contacts within the number of levels.

6. The method of claim 1, wherein selecting at least a portion of the identified contacts comprises selecting all contacts at a level N.

7. The method of claim 1, wherein selecting at least a portion of the identified contacts comprises selecting a sub-group of closely associated contacts from among the identified contacts.

8. The method of claim 1, wherein identifying the plurality of contacts comprises including the first contact as one of the plurality of contacts.

9. The method of claim 1, wherein identifying the plurality of contacts comprises excluding the first contact from the plurality of contacts.

10. An apparatus, comprising:
a communications adapter or a user interface that receives a request identifying a first contact; and
a processor that automatically indicates a number (N) of levels, associated with the first contact, to identify a plurality of contacts contained within the number (N) of levels, wherein contacts at a first level (N=1) are contained in a contact list of the first contact and contacts at levels greater than 1 (N>1) are not contained in the contact list of the first contact, and selects at least a portion of the identified contacts to include within the communication group.

11. The apparatus of claim 10, wherein the processor identifies the first contact by processing an image comprising the first contact.

12. The apparatus of claim 10, wherein the processor selects at least a portion of the identified contacts by selecting all contacts within the number of levels.

13. The apparatus of claim 10, wherein the processor selects at least a portion of the identified contacts by selecting all contacts at a level N.

14. The apparatus of claim 10, wherein the processor receives a selection of a sub-group of closely associated contacts, the sub-group selected from among the identified contacts.

15. A machine readable storage, having stored thereon a computer program having a plurality of code sections comprising:
code for identifying a first contact associated with a second communication device;
code for automatically indicating a number (N) of levels, associated with the first contact, to identify a plurality of contacts contained within the number (N) of levels, wherein contacts at a first level (N=1) are contained in a contact list of the first contact and contacts at levels greater than 1 (N>1) are not contained in the contact list of the first contact; and
code for selecting at least a portion of the identified contacts to include within the communication group.

16. The machine readable storage of claim 15, wherein the code for identifying the first contact comprises code for processing an image comprising the first contact.

17. The machine readable storage of claim 15, wherein the code for identifying the first contact comprises code for receiving a selection of the first contact from a contact list.

18. The machine readable storage of claim 15, wherein the code for identifying the first contact comprises code for receiving a selection of the first contact from a recent call list.

19. The machine readable storage of claim 15, wherein the code for selecting at least a portion of the identified contacts comprises code for selecting all contacts within the number of levels or code for selecting all contacts at a level N.

20. The machine readable storage of claim 15, wherein the code for selecting at least a portion of the identified contacts comprises code for selecting a sub-group of closely associated contacts from among the identified contacts.

* * * * *